United States Patent
Ichimura et al.

(10) Patent No.: US 8,962,125 B2
(45) Date of Patent: Feb. 24, 2015

(54) ANTI-CHIPPING SHEET

(75) Inventors: Syuji Ichimura, Bunkyo-ku (JP); Masataka Sudo, Bunkyo-ku (JP)

(73) Assignee: Nichiban Co., Ltd., Tokyo (JP)

( * ) Notice: Subject to any disclaimer, the term of this patent is extended or adjusted under 35 U.S.C. 154(b) by 689 days.

(21) Appl. No.: 12/865,261

(22) PCT Filed: Jan. 31, 2008

(86) PCT No.: PCT/JP2008/051520
§ 371 (c)(1),
(2), (4) Date: Jul. 29, 2010

(87) PCT Pub. No.: WO2009/096020
PCT Pub. Date: Aug. 6, 2009

(65) Prior Publication Data
US 2011/0008599 A1    Jan. 13, 2011

(51) Int. Cl.
 B32B 7/02    (2006.01)
 C09J 7/02    (2006.01)
 B32B 7/12    (2006.01)
 B32B 27/08   (2006.01)

(52) U.S. Cl.
 CPC ............. *C09J 7/0296* (2013.01); *B32B 7/12* (2013.01); *B32B 27/08* (2013.01); *C09J 2201/162* (2013.01)
 USPC ........................................ 428/212; 428/220

(58) Field of Classification Search
 CPC .............. B32B 7/02; B32B 7/12; B32B 27/08
 USPC ....................... 428/212, 220, 411.1
 See application file for complete search history.

(56) References Cited

U.S. PATENT DOCUMENTS

| | | | |
|---|---|---|---|
| 6,506,490 B1 * | 1/2003 | Yamamoto | 428/343 |
| 2002/0055006 A1 | 5/2002 | Vogel et al. | |
| 2004/0076846 A1 | 4/2004 | Domine et al. | |
| 2007/0059903 A1 * | 3/2007 | Yano et al. | 438/459 |
| 2007/0154694 A1 * | 7/2007 | Samuels et al. | 428/216 |
| 2010/0167049 A1 | 7/2010 | Ichimura et al. | |

FOREIGN PATENT DOCUMENTS

| | | |
|---|---|---|
| JP | 9-277379 | 10/1997 |
| JP | 2003-531028 | 10/2003 |
| JP | 2004-525001 | 8/2004 |
| JP | 2006-062290 | 3/2006 |
| WO | WO-2007/069330 | 6/2007 |

* cited by examiner

*Primary Examiner* — Aaron Austin
*Assistant Examiner* — Lawrence Ferguson
(74) *Attorney, Agent, or Firm* — Jordan and Hamburg LLP

(57) ABSTRACT

An anti-chipping sheet includes at least a substrate layer and a pressure-sensitive adhesive layer, wherein the substrate layer comprises laminated multiple ionomer layers, each of which comprises an ionomer produced by neutralizing carboxyl groups of an ethylene-unsaturated carboxylic acid copolymer with metal ions, one of the multiple ionomer layers is a high-rigidity ionomer layer, located at the outermost layer and not in contact with the pressure-sensitive adhesive layer of the substrate layer, and having stiffness of 200 $N/mm^2$ or higher, and another one of the multiple ionomer layers is a low-rigidity ionomer layer, located toward the pressure-sensitive adhesive layer in relation to the outermost layer, and having stiffness of lower than 200 $N/mm^2$.

8 Claims, No Drawings

ANTI-CHIPPING SHEET

BACKGROUND OF THE INVENTION

The present invention relates to anti-chipping sheets for protecting various surfaces against the phenomenon in which pebbles, small objects and the like on roads are bounced up by wheels to impinge upon automobile bodies to damage coated surfaces of the bodies while the automobiles are moving.

For exterior trims of automobiles, widely used are steel plates or plastic resin materials that are molded and whose surfaces are covered with a coating or the like. Among them, those on the sides and underside of the automobile bodies are likely to develop scratches, cracks, dents and the like on the coated surfaces of the steel plates and exterior trims due to impingement or the like of hard objects such as rocks bounced up by tires while the automobiles are running.

In order to prevent such scratches, cracks, dents and the like from developing on the surfaces, anti-chipping coating has traditionally been carried out with vinyl chloride-based sols. Such sols may, however, produce dioxin when they are incinerated. Also, coated surface is protected by applying a chipping film of urethane-based substrate covered with fluorine coating. The raw materials and the coating are, however, expensive, thereby rendering the anti-chipping films also expensive. Due to such cost restrictions, they cannot be applied to all portions where scratches, cracks, dents or the like are likely to develop on the surfaces but are often used only partly, suffering from problems substantially (Patent Reference 1).

In order to solve these problems, chipping films whose substrates are made of ionomer and polyolefin-based polymer layers have been proposed as low-priced chipping films that are capable of protecting various surfaces, in particular, preventing scratches, cracks, dents and the like from developing on exterior trims of automobiles, while conforming to asperities and extremities of the applied objects and being applied easily and in a good-looking manner (Patent Reference 2).

Patent Reference 1: Japanese Unexamined Patent Publication Hei 9-277379
Patent Reference 2: WO2007/069330

SUMMARY OF THE INVENTION

When the anti-chipping films described in Patent Reference 2 are used, however, a problem arises that since materials with different refractive indices are laminated, transparency will be impaired when they are applied on coated surfaces of steel plates or exterior trims, turning the appearance whitish. As such, the inventors attempted to develop chipping films having the aforementioned characteristics by making a substrate layer of a single ionomer layer and modifying the composition of the ionomer, in order to solve the problem of appearance turning whitish. However, when an ionomer with high rigidity is used, the problem of insufficient conformity in application will arise, while when an ionomer with low rigidity is used, the substrate will be dented by pressure upon application, causing a problem that a squeegee may only glide with difficulty. Therefore, it was impossible to obtain anti-chipping films that are excellent in application characteristics.

To cope therewith, the present invention aims to provide anti-chipping sheets using an ionomer as a substrate layer, which will not turn whitish in appearance when they are applied on coated surfaces of steel plates and/or exterior trims and are excellent in application characteristics.

Specifically, the present invention (1) is a anti-chipping sheet comprising at least a substrate layer and a pressure-sensitive adhesive layer,
wherein the substrate layer is composed of laminated multiple ionomer layers, each of which comprises an ionomer produced by neutralizing carboxyl groups of an ethylene-unsaturated carboxylic acid copolymer with metal ions,
one of the multiple ionomer layers is a high-rigidity ionomer layer, located at the outermost layer and not in contact with the pressure-sensitive adhesive layer of the substrate layer, and having stiffness of 200 $N/mm^2$ or higher, and
another one of the multiple ionomer layers is a low-rigidity ionomer layer, located toward the pressure-sensitive adhesive layer in relation to the outermost layer, and having stiffness of lower than 200 $N/mm^2$.

The present invention (2) is the anti-chipping sheet according to the invention (1) wherein the difference in stiffness between the high-rigidity ionomer and the low-rigidity ionomer is equal to 30 $N/mm^2$ or higher.

The present invention (3) is the anti-chipping sheet according to the invention (1) or (2) wherein the high-rigidity ionomer layer has a melting point of 90° C. or higher.

The present invention (4) is the anti-chipping sheet according to any one of the inventions (1) to (3) wherein the substrate layer further includes the high-rigidity ionomer layer, located toward the pressure-sensitive adhesive layer in relation to the low-rigidity ionomer layer and in contact with the pressure-sensitive adhesive layer.

The present invention (5) is the anti-chipping sheet according to the invention (4) wherein the two high-rigidity ionomer layers have the same composition.

The present invention (6) is the anti-chipping sheet according to any one of the inventions (1) to (3) wherein the substrate layer has a two-layer structure in which the high-rigidity ionomer layer has a thickness of 15 μm to 100 μm and the low-rigidity ionomer layer has a thickness of 100 μm to 400 μm.

The present invention (7) is the anti-chipping sheet according to the invention (4) or (5) wherein the substrate layer has a three-layer structure in which the high-rigidity ionomer layer located at the outermost layer and not in contact with the pressure-sensitive adhesive layer of the substrate layer has a thickness of 15 μm to 100 μm, the low-rigidity ionomer layer located toward the pressure-sensitive adhesive layer in relation to the outermost layer has a thickness of 100 μm to 400 μm and the high-rigidity ionomer layer in contact with the pressure-sensitive adhesive layer has a thickness of 15 μm to 100 μm and wherein the whole substrate layer has a thickness of 130 μm to 500 μm.

The present invention (8) is the anti-chipping sheet according to any one of the inventions (1) to (7) wherein the product of the tensile modulus of elasticity of the substrate layer ($N/mm^2$) and the thickness of the substrate layer (mm) is equal to 55 N/mm or lower.

Definitions of terms used in the specification and claims will now be described. Ethylene-unsaturated carboxylic acid copolymers are not particularly limited, as long as they are copolymers (whether random or block) that use ethylene and an unsaturated carboxylic acid as monomer components. Included are not only bicopolymers consisting only of these components but also multicopolymers consisting of three or more components, using other monomers. "Produced by neutralizing carboxyl groups . . . with metal ions" means that at least a part of the carboxyl groups are neutralized with metal ions.

According to the present invention, since the substrate layer of the anti-chipping sheet is a laminate consisting only of ionomer layers, such an effect is provided that the appearance will not turn whitish even when it is applied to coated surfaces of steel plates and/or exterior trims. Further, combination of ionomer layers having different specified parameter values provides such effects that, as basic characteristics of anti-chipping films, they are capable of protecting various surfaces, in particular, effectively preventing scratches, cracks, dents and the like from developing on exterior trims of automobiles, while conforming to asperities and/or extremities of the applied objects and being applied easily and in a good-looking manner, which may not be obtained with a single ionomer layer.

DETAILED DESCRIPTION OF THE INVENTION

A best mode of the present invention will be described below. First, an anti-chipping sheet according to the best mode has a substrate layer, a pressure-sensitive adhesive layer formed on one side of the substrate layer and a separator layer formed on the other side of the pressure-sensitive adhesive layer. First, description will be made of the substrate layer as a characteristic part of the present invention.

Substrate Layer

A substrate layer according to the best mode is composed of two or more layers, each of which is an ionomer layer produced by neutralizing carboxyl groups of an ethylene-unsaturated carboxylic acid copolymer with metal ions. The upper limit of the number of layers is not particularly defined, but is seven, for example. Of the ionomer layers, at least one is a high-rigidity ionomer layer and at least one is a low-rigidity ionomer layer. Specific examples of structures of substrate layers include a two-layer structure made of a high-rigidity ionomer layer, located at the outermost layer and not in contact with a pressure-sensitive adhesive layer and a low-rigidity ionomer layer, located at the inner layer and in contact with the pressure-sensitive adhesive layer and a three-layer structure made of a first high-rigidity ionomer layer, located at the outermost layer and not in contact with a pressure-sensitive adhesive layer, a second high-rigidity ionomer layer, located at the inner layer and in contact with the pressure-sensitive adhesive layer and a low-rigidity ionomer layer, located between the two high-rigidity ionomer layers. First, compositions of the ionomer layers will be described in detail, followed by properties of each layer in sequence.

Ionomer Layers

An ionomer layer according to the best mode is made of an ionomer produced by neutralizing carboxyl groups of an ethylene-unsaturated carboxylic acid copolymer with metal ions. Examples of unsaturated carboxylic acids for composing ethylene-unsaturated carboxylic acid copolymers include acrylic acid, methacrylic acid, maleic acid, itaconic acid, monomethyl maleate, monoethyl maleate, maleic anhydride and itaconic anhydride. Among these, (meth)acrylic acids are particular preferred. Among the ethylene-unsaturated carboxylic acid copolymers, those in which the content of unsaturated carboxylic acids are from 2 to 30% by weight and in particular from 5 to 20% by weight are preferably used, in consideration of processability, adhesion between layers, blocking resistance and the like.

Here, ethylene-unsaturated carboxylic acid copolymers include not only bi-copolymers consisting of ethylene and an unsaturated carboxylic acid, but also multi-copolymers in which other monomers are further copolymerized. Examples of such other monomers that may be copolymerized into ethylene-unsaturated carboxylic acid copolymers include vinyl esters such as vinyl acetate and vinyl propionate as well as unsaturated carboxylic acid esters such as methyl acrylate, ethyl acrylate, isobutyl acrylate, n-butyl acrylate, methyl methacrylate, isobutyl methacrylate, dimethyl maleate and diethyl maleate. When such other monomers are contained, it is preferred that they are contained in copolymers, for example at 30% by weight or less and preferably at 20% by weight or less.

Examples of metal ions that may be used include metal cations of alkaline metals such as lithium, sodium and potassium, alkaline earth metals such as magnesium and calcium as well as transition metals such as zinc. Ionomers may be those that contain two or more of these metal cations and further those that form complex compounds with organic amines such as n-hexylamine, hexamethylenediamine, 1,3-bisaminomethylcyclohexane and m-xylenediamine. Ionomers having a degree of neutralization of 90% or lower and in particular 70% or lower are preferred as the ionomers described above. The lower limit of the degree of neutralization is preferably 5% and more preferably 10%. Here, a "degree of neutralization" means a percentage of carboxylic acid groups neutralized by metal ions.

Here, specific examples of preferred ionomers for composing the high-rigidity ionomer layers may include Himilan 1554 (trade name for ionomer of ethylene-methacrylic acid copolymer neutralized by zinc ion) manufactured by Du Pont-Mitsui Polychemicals Co., Ltd. When multiple high-rigidity ionomer layers are present, ionomers composing those layers may be the same or different, being the same being preferred from the viewpoint of less tendency of films curling.

Here, specific examples of preferred ionomers for composing the low-rigidity ionomer layers may include Himilan 1855 (trade name for ionomer of ethylene-methacrylic acid copolymer neutralized by zinc ion) manufactured by Du Pont-Mitsui Polychemicals Co., Ltd. When multiple low-rigidity ionomer layers are present, ionomers composing those layers may be the same or different.

Also, high-rigidity and low-rigidity ionomers to be used should preferably have different melting points (JIS K 7121) as determined by a differential scanning calorimeter (DSC). In particular, the high-rigidity ionomers should have a melting point preferably at 90° C. or higher, more preferably at 92° C. or higher and even more preferably at 95° C. or higher. The upper limit is not particularly defined, but is 120° C., for example. With such melting points, appearance is less likely to change at elevated temperatures. Also, the difference in melting point between the high-rigidity and low-rigidity ionomers is preferably 5° C. or more.

Furthermore, the ionomers should have an MFR (melt flow rate, JIS K 7210) preferably of 0.5 to 10.0 g/10 min, more preferably of 0.6 to 6.0 g/10 min and even more preferably of 0.8 to 2.0 g/10 min. MFRs herein are values as determined according to the method set forth in JIS K-7210 (at 190° C., with a load of 2,160 g).

Properties of Each Layer

Ionomers for composing the high-rigidity ionomer layers should have stiffness preferably of 200 $N/mm^2$ or higher, more preferably of 220 $N/mm^2$ or higher and even more preferably of 240 $N/mm^2$ or higher. The upper limit is not particularly defined, but is 350 $N/mm^2$, for example. The low-rigidity ionomer layers should have stiffness preferably of lower than 200 $N/mm^2$, more preferably of lower than 130 $N/mm^2$ and even more preferably of lower than 100 $N/mm^2$. The lower limit is not particularly defined, but is 70 $N/mm^2$, for example. Also, the difference in stiffness between the high-rigidity and low-rigidity ionomers is preferably 30 $N/mm^2$ or more, more preferably 60 $N/mm^2$ or more and even more preferably 100 $N/mm^2$ or more. The upper limit is not particularly defined, but is 230 N/mm², for example. Such physical properties can appropriately be modified by altering the copolymerization ratio, molecular weight, degree of neutralization and the like of unsaturated carboxylic acids. For example, in order to obtain a high rigidity, it may be attained by increasing the proportion of unsaturated carboxylic acids in ionomers and/or increasing the degree of neutralization of ionomers. Also, stiffness indices in CLAIMS and DESCRIPTION refer to values as determined according to the method set forth in JIS K 7106.

Next, the substrate layer will be described with respect its thickness. First, the whole substrate layer has a thickness preferably in the range of 130 to 500 μm, more preferably in the range of 160 to 400 μm and even more preferably in the range of 180 to 350 μm. Within such ranges, anti-chipping sheets may have flaw-preventing functions and be excellent in workability. Next, with respect to thickness of each layer, preferred ranges may differ depending on the number of layers. For example, when the substrate layer has a two-layer structure, the high-rigidity ionomer layer has a thickness preferably of 15 to 100 μm, more preferably of 20 to 80 μm and even more preferably of 30 to 60 μm and the low-rigidity ionomer has a thickness preferably of 100 to 400 μm, more preferably of 100 to 350 μm and even more preferably of 100 to 300 μm. Within such ranges, heat resistance and flexibility may be well-balanced. Also, when the substrate layer has a three-layer structure, the high-rigidity ionomer layer, located at the outermost layer and not in contact with the pressure-sensitive adhesive layer of the substrate layer has a thickness preferably of 15 to 100 μm, more preferably of 20 to 80 μm and even more preferably of 30 to 60 μm, the low-rigidity ionomer layer located toward the pressure-sensitive adhesive layer in relation to the outermost layer has a thickness preferably of 100 to 400 μm, more preferably of 100 to 350 μm and even more preferably of 100 to 300 μm and the high-rigidity ionomer layer in contact with the pressure-sensitive adhesive layer has a thickness preferably of 15 to 100 μm, more preferably of 20 to 80 μm and even more preferably of 30 to 60 μm. Within such ranges, heat resistance and flexibility may be well-balanced.

Furthermore, the relationship between the tensile modulus of elasticity of the substrate layer (N/mm²) and the thickness of the substrate layer (mm) will be described. The product of the tensile modulus of elasticity of the substrate layer (N/mm²) and the thickness of the substrate layer (mm) is preferably from 18 to 55, more preferably from 22 to 50 and even more preferably from 25 to 47. Within such ranges, chipping resistance and workability may be improved. Also, under 18, the films tend to be too soft to be worked on, while over 55, the films tend to be so stiff that conformability to applied objects may be impaired. Tensile moduli of elasticity in CLAIMS and DESCRIPTION refer to values as determined according to the method set forth in JIS K 7113.

Pressure-Sensitive Adhesive Layer

Next, a pressure-sensitive adhesive layer of the anti-chipping sheet according to the best mode will be described. Here, pressure-sensitive adhesives are not particularly limited, examples of which may include acrylic, rubber-based and silicone-based pressure-sensitive adhesives, with acrylic pressure-sensitive adhesives being preferred in terms of weatherability and costs. Its thickness is preferably in the range of 10 to 70 μm. Within such a range, such possibilities that sufficient adhesive strength may not be obtained so that lifting or curl-back may occur at extremities and that anti-chipping sheets may be displaced after application may effectively be avoided.

Separator Layer

Next, a separator layer of the anti-chipping sheet according to the best mode will be described. Here, separators (release paper) are not particularly limited, so that various release-coated films, polyethylene-laminated paper and paper may be used, for example. Also, release paper having regular or irregular asperities may be used to provide asperities on the pressure-sensitive adhesive surface to improve ease of application.

Process for Production

Next, a process for producing the anti-chipping sheet according to the best mode will be described. First, a substrate layer according to the best mode can be formed by coextrusion with the use of an adhesive resin, extrusion lamination, extrusion lamination with the use of a solvent-based adhesive and/or dry lamination.

In order to improve the adhesion strength between the substrate layer and the pressure-sensitive adhesive layer, the inner layer may be surface-treated with corona discharge or the like. Also, in place of or in addition to such surface treatment, anchor coating may be provided. Anchor coating agents to be used for the anti-chipping sheet according to the present invention are not particularly limited, examples of which include acrylic, urethane-based and olefin-based resins, and are provided at a thickness preferably in the range of 0.1 to 20 μm.

After producing the substrate layer in this manner, a pressure-sensitive adhesive liquid is applied to the inner layer of the substrate layer and dried to form a pressure-sensitive adhesive layer. Here, a separator layer (release paper) is laminated to the side of pressure-sensitive adhesive to improve handling and processability. When a release paper is laminated, a pressure-sensitive adhesive liquid may be applied on the release paper and dried to provide a pressure-sensitive adhesive and then the side of pressure-sensitive adhesive may be laminated with the inner soft layer of the substrate to produce the substrate layer.

Applications

Next, a method for using the anti-chipping sheet according to the best mode will be described. The anti-chipping sheet according to the best mode is applied to portions, such as side sills, lower portions of doors and lower portions of wheel arches of front and rear fenders of automobile bodies, where chipping resistance is of particular concern.

EXAMPLES

Example 1

Three layers having the compositions below were coextruded to provide a substrate layer consisting of the three layers. Detailed information of each layer is shown below. "Himilan" is manufactured by Du Pont-Mitsui Polychemicals Co., Ltd. and is a trademark of the same.

Outer layer: Himilan 1554 (ionomer of ethylene-methacrylic acid copolymer, ion type: Zn, tensile modulus of elasticity: 301 N/mm², stiffness: 265 N/mm², MFR: 1.3 g/10 min, melting point: 97° C., thickness: 40 μm)

Intermediate layer: Himilan 1855 (ionomer of tercopolymer of ethylene, methacrylic acid and an optional component, ion type: Zn, tensile modulus of elasticity: 117 N/mm², stiffness: 92 N/mm², MFR: 1.0 g/10 min, melting point: 86° C., thickness: 120 μm)

Inner layer: Himilan 1554 (ionomer of ethylene-methacrylic acid copolymer, ion type: Zn, tensile modulus of elasticity: 301 N/mm², stiffness: 265 N/mm², MFR: 1.3 g/10 min, melting point: 97° C., thickness: 40 μm)

Substrate as a whole: tensile modulus of elasticity: 156 N/mm², thickness: 200 μm The inner layer of the substrate layer obtained by the step described above was corona-treated. A copolymer solution of 2-ethylhexylacrylate:acrylic acid=95:5 was applied as an acrylic pressure-sensitive adhesive to the corona-treated surface and dried (dry thickness: 50 μm) and the pressure-sensitive adhesive surface was covered with KP8D produced by Lintec Corporation as a separator layer (release paper) to fabricate an anti-chipping sheet. The anti-chipping sheet suffered no defects in appearance such as whitening.

Example 2

An anti-chipping sheet was fabricated under the same conditions as those in Example 1 except that the layers composing the substrate layer were different in thickness. The anti-chipping sheet suffered no defects in appearance such as whitening. The thickness of each of the layers is shown below.

Outer layer: thickness: 20 μm
Intermediate layer: thickness: 260 μm
Inner layer: thickness: 20 μm
Substrate as a whole: tensile modulus of elasticity: 151 N/mm², thickness: 300 μm

Example 3

A two-layer substrate having the structure below was coextruded to fabricate a film to produce an anti-chipping sheet. The anti-chipping sheet suffered no defects in appearance such as whitening. The anti-chipping sheet was fabricated under similar conditions as those in Example 1 except for the process for producing the substrate layer.

Outer layer: Himilan 1554, thickness: 40 μm
Inner layer: Himilan 1855, thickness: 160 μm
Substrate as a whole: tensile modulus of elasticity: 141 N/mm², thickness: 200 μm

Comparative Example 1

Using single-layer films 200 μm and 300 μm in thickness only of Himilan 1554, anti-chipping sheets were fabricated. The anti-chipping sheets were fabricated under similar conditions as those in Example 1 except for the process for producing the substrate layers.

Comparative Example 2

Using single-layer films 100 μm, 200 μm and 300 μm in thickness only of Himilan 1855, anti-chipping sheets were fabricated. The anti-chipping sheets were fabricated under similar conditions as those in Example 1 except for the process for producing the substrate layers.

Aging Test

Aging tests were carried out on the anti-chipping sheets fabricated in Examples 1 to 3 and Comparative Examples 1 to 2 described above. The films were cut to a size of 50 mm in width and 100 mm in length to produce samples. These samples were applied, with the pressure-sensitive adhesive surfaces exposed by removing the release paper, to coated plates larger in size (70 mm×140 mm). After being left for 24 hours, the samples were placed in an oven at 80° C. and heated for seven days (168 hours). Thereafter, the samples were left at room temperature for 24 hours and then observation was made to determine the presence or absence of changes in appearance of the films and failures at the joints. The absence and presence of changes in appearance were rated as ○ and x respectively. The results are shown in Table 1.

Anti-Chipping Test

Flaw resistance tests were carried out on the anti-chipping sheets fabricated in Examples 1 to 3 and Comparative Examples 1 to 2 described above. Samples were produced to a size of 70 mm×150 mm and, the release paper was removed. The samples were applied to coated steel plates under a load of 29.4 N, to avoid air inclusion. The samples were placed in an atmosphere at 23±2° C. and 50±5% RH for 48 hours. While the test specimens were held upright, 300 g of No. 7 crushed stone were impacted horizontally at a distance of 35 cm with a pressure of 0.39 MPa using a gravelometer and the test specimens were subjected to the salt spray test set forth in JIS Z 2371 for 120 hours to investigate scores of rust growth. Scores 5 and lower and scores 6 and higher in rust growth were rated as ○ and x respectively. The results are shown in Table 1.

Adhesion Test

Test specimens 25 mm×100 mm in size were applied to a right-angled corner of a coated PP resin form, 1 cm extending on one side and 9 cm extending on the other and the form was placed in an atmosphere at 23° C. and 50% to investigate lifting. Not lifted and lifted were rated as ○ and x respectively. The results are shown in Table 1.

TABLE 1

|  |  | Example 1 | Example 2 | Example 3 | Comparative Example 1 | Comparative Example 1 | Comparative Example 2 | Comparative Example 2 | Comparative Example 2 |
|---|---|---|---|---|---|---|---|---|---|
| Thickness (μm) | Outer layer | 40 | 20 | 40 | 200 | 300 | 100 | 200 | 300 |
|  | Intermediate layer | 120 | 260 |  |  |  |  |  |  |
|  | Inner layer | 40 | 20 | 160 |  |  |  |  |  |
| Flexural ridigity (N/mm²) | Outer layer | 265 | 265 | 265 | 265 | 265 | 92 | 92 | 92 |
|  | Intermediate layer | 92 | 92 | 92 |  |  |  |  |  |
|  | Inner layer | 265 | 265 |  |  |  |  |  |  |
| Product of tensile modulus of elasticity of substrate layer and thickness of substrate layer (N/mm²) |  | 31.2 | 45.3 | 28.2 | 60.2 | 90.3 | 11.7 | 23.4 | 35.1 |
| Ageing tests (○: no changes observed in appearance, x: changes observed in appearance) |  | ○ | ○ | ○ | ○ | ○ | x (Decreased glossiness) | x (Decreased glossiness) | x (Decreased glossiness) |
| Flaw resistance tests (○: rust growth scores 5 and lower, x: 6 and higher) |  | ○ | ○ | ○ | ○ | ○ | x | ○ | ○ |
| Adhesion tests (○: not lifted, x: lifted) |  | ○ | ○ | ○ | x | x | ○ | ○ | ○ |

The invention claimed is:

1. An anti-chipping sheet comprising at least a substrate layer and a pressure-sensitive adhesive layer,
   the substrate layer being comprised of laminated multiple ionomer layers, each of the ionomer layers comprising an ionomer produced by neutralizing carboxyl groups of an ethylene-unsaturated carboxylic acid copolymer with metal ions,
   one of the multiple ionomer layers, located as the outermost layer and not in contact with the pressure-sensitive adhesive layer of the substrate layer, has a stiffness of 200 N/mm$^2$ or higher, and
   another one of the multiple ionomer layers, located closer to the pressure-sensitive adhesive layer in relation to the outermost layer, has a stiffness lower than 200 N/mm$^2$, and wherein the whole substrate layer has a thickness of 160 μm to 400 μm.

2. The anti-chipping sheet according to claim 1, wherein the difference in stiffness between the one of the multiple ionomer layers and the another one of the multiple ionomer layers is equal to or greater than 30 N/mm$^2$.

3. The anti-chipping sheet according to claim 1, wherein the one of the multiple ionomer layers has a melting point of 90° C. or higher.

4. An anti-chipping sheet comprising at least a substrate layer and a pressure-sensitive adhesive layer,
   the substrate layer being comprised of laminated multiple ionomer layers, each of the ionomer layers comprising an ionomer produced by neutralizing carboxyl groups of an ethylene-unsaturated carboxylic acid copolymer with metal ions,
   a first ionomer layer of the multiple ionomer layers is located as the outermost layer and is not in contact with the pressure-sensitive adhesive layer of the substrate layer, the first ionomer layer having a stiffness of 200 N/mm$^2$ or higher,
   a second ionomer layer of the multiple ionomer layers is located closer to the pressure-sensitive adhesive layer in relation to the outermost layer, the second ionomer layer having a stiffness lower than 200 N/mm$^2$, and a third ionomer layer of the multiple ionomer layers having a stiffness greater than the stiffness of the second ionomer layer located closer to the pressure-sensitive adhesive layer in relation to the second ionomer layer and in contact with the pressure-sensitive adhesive layer, wherein the whole substrate layer has a thickness of 160 μm to 400 μm.

5. The anti-chipping sheet according to claim 4, wherein the first and third ionomer layers have the same composition.

6. The anti-chipping sheet according to claim 1, wherein the substrate layer has a two-layer structure in which the one of the multiple ionomer layers has a thickness of 15 μm to 100 μm and the low-rigidity ionomer layer has a thickness of 100 μm to 350 μm.

7. The anti-chipping sheet according to claim 4, wherein the substrate layer has a three-layer structure in which the first ionomer layer has a thickness of 15 μm to 100 μm, the second ionomer layer has a thickness of 100 μm to 350 μm, and the third ionomer layer has a thickness of 15 μm to 100 μm.

8. The anti-chipping sheet according to claim 1, wherein the product of the tensile modulus of elasticity of the substrate layer (N/mm$^2$) and the thickness of the substrate layer (mm) is equal to 55 N/mm or lower.

* * * * *